(12) United States Patent
van der Loo

(10) Patent No.: US 6,183,834 B1
(45) Date of Patent: Feb. 6, 2001

(54) BALISTIC-RESISTANT MOULDED ARTICLE AND A PROCESS FOR THE MANUFACTURE OF THE MOULDED ARTICLE

(75) Inventor: Leonardus L. H. van der Loo, Beek (NL)

(73) Assignee: DSM N.V. (NL)

( * ) Notice: Under 35 U.S.C. 154(b), the term of this patent shall be extended for 0 days.

(21) Appl. No.: 08/995,754

(22) Filed: Dec. 22, 1997

Related U.S. Application Data

(63) Continuation of application No. PCT/NL96/00247, filed on Jun. 14, 1996.

(30) Foreign Application Priority Data

Jun. 20, 1995 (NL) ....................................................... 1000598

(51) Int. Cl.⁷ ................................. B32B 3/06; B28B 5/00
(52) U.S. Cl. ........................ 428/107; 428/112; 428/219; 264/241; 264/250; 264/263
(58) Field of Search .................................... 428/105, 107, 428/112, 219; 264/241, 250, 263

(56) References Cited

U.S. PATENT DOCUMENTS

| | | |
|---|---|---|
| 3,743,561 | 7/1973 | Koontz et al. . |
| 4,344,908 | 8/1982 | Smith et al. . |
| 4,916,000 * | 4/1990 | Li et al. ................................ 428/105 |
| 4,953,234 | 9/1990 | Li et al. . |
| 5,124,195 | 6/1992 | Harpell et al. . |
| 5,160,776 * | 11/1992 | Li et al. ................................ 428/109 |

FOREIGN PATENT DOCUMENTS

| | | |
|---|---|---|
| 191 306 | 8/1986 | (EP) . |
| 2042414 | 9/1980 | (GB) . |
| 2051667 | 1/1981 | (GB) . |
| 89/06190 | 7/1989 | (WO) . |
| 91/12136 | 8/1991 | (WO) . |
| WO 95/00318 | 1/1995 | (WO) . |
| 98/06190 | 2/1998 | (WO) . |

* cited by examiner

*Primary Examiner*—Christopher Raimund
(74) *Attorney, Agent, or Firm*—Pillsbury Madison & Sutro LLP

(57) ABSTRACT

The invention relates to a ballistic-resistant molded article containing a compressed stack of monolayers, with each monolayer containing unidirectionally oriented reinforcing fibers and at most 30 wt. % of a plastic matrix material and with the fiber direction in each monolayer being rotated with respect to the fiber direction in an adjacent monolayer, characterized in that the density ($\rho_P$) of the compressed stack is at least 98.0% of the theoretical maximum density. The invention also relates to a process for manufacturing the molded article. The ballistic-resistant article may be used in, for instance, helmets, as inserts in bullet-proof vests, as armoring on military vehicles and in ballistic-resistant panels.

21 Claims, No Drawings

BALISTIC-RESISTANT MOULDED ARTICLE AND A PROCESS FOR THE MANUFACTURE OF THE MOULDED ARTICLE

This is a Continuation of: International Appln. No. PCT/NL96/00247 filed Jun. 14, 1996 which designated the U.S.

FIELD OF THE INVENTION

The invention relates to a ballistic-resistant moulded article containing a compressed stack of monolayers, with each monolayer containing unidirectionally oriented reinforcing fibres and at most 30 wt. % of a plastic matrix material and with the fibre direction in each monolayer being rotated with respect to the fibre direction in an adjacent monolayer. The invention also relates to a process for the manufacture of the moulded article. The ballistic-resistant moulded article may be used in, for instance, helmets, as inserts in bullet-proof vests, as armouring on military vehicles and in ballistic-resistant panels.

BACKGROUND OF THE INVENTION

A ballistic-resistant moulded article of this type is disclosed in WO 89/06190. The known ballistic-resistant moulded article affords fairly good protection against impacts of projectiles such as shrapnel or bullets. The level of protection is quantified by means of the Specific Energy Absorption (SEA), a measure of the amount of energy that can be absorbed by a moulded article on impact of a projectile per unit areal weight of the moulded article. Fairly good protection by the known moulded article on impact of a bullet is intended to mean an SEA value of from about 30 $Jm^2/kg$ to maximum 65 $Jm^2/kg$. The March 1992 "Ballistics" leaflet of Messrs Allied-Signal Inc., Petersburg, Va., quotes as highest SEA level an SEA of 65 $Jm^2/kg$ on impact of a 7.62×39 Mild Steel Core P.S. Ball M1943. This SEA level has been achieved after years of optimization and was regarded by ballistics experts as being very high.

Nevertheless, there continues to be a great need for ballistic-resistant moulded articles that can offer increased protection against impacts of projectiles of various kinds, especially against projectiles in the form of bullets.

SUMMARY OF THE INVENTION

The inventors of the present invention have found that this object is achieved by the density $\rho_P$ of the compressed stack in the ballistic-resistant moulded article being at least 98.0% of the theoretical maximum density.

The theoretical maximum density $\rho_{th}$ is calculated using the following formula:

$$\rho_{th} = \rho_f m_f + \rho_k m_k$$

where $\rho_{th}$=density of the fibres $\rho_k$=density of the plastic $m_f$=mass fraction of the fibres in the compressed stack $M_k$=mass fraction of the plastic in the compressed stack Surprisingly, a ballistic-resistant moulded article of the invention has an SEA value of at least 75 $Jm^2/kg$ on impact of a 7.62×39 Mild Steel Core P.S. Ball M1943.

The percentage of the theoretical maximum density is hereafter referred to as the relative density. Preferably, the relative density of the compressed stack is at least 98.5%, more preferably at least 99.0% and most preferably at least 99.5%. In this way, a ballistic-resistant moulded article having an even better SEA value is obtained. More preferably, the SEA value is at least 90, even more preferably at least 110 $Jm^2/kg$, most preferably at least 120 $Jm^2/kg$.

The density of the ballistic-resistant moulded article can be determined in a manner known to one skilled in the art. A suitable, accurate method is described in ASTM D 792-91. Another suitable method for flat or slightly flexed moulded articles comprises measurement of the density by measuring the weight and accurately measuring the volume with the aid of a Vernier calliper. By this measurement, if accurately performed, the density can be determined with a standard deviation of 0.2–0.4%.

The SEA is defined by $0.5.m.v_{50}^2/AD$, where m is the mass of the projectile. The $v_{50}$ is the velocity of the projectiles fired at the moulded article at which 50% of the projectiles fully penetrate the moulded article, AD is the areal weight of the moulded article.

Owing to the surprisingly high SEA achieved, not only moulded articles with an unheard-of level of protection for a given weight of the moulded article are now available but also moulded articles affording the same level of protection as the known moulded article at a significantly lower weight. Low weight per unit area is of great importance in many applications. This is the case, for instance, in the field of personal protective equipment such as helmets, shields, shoes and the like. Low weight is also essential for the application of ballistic-resistant moulded articles in for instance helicopters, motorcars and high-speed, highly manoeuvrable combat vehicles.

The areal weight of the moulded article depends on the desired level of protection. Preferably, the areal weight is between 10 and 40 $kg/m^2$. Below 10 $kg/m^2$, the level of protection is inadequate for most threats, above 40 $kg/m^2$ the weight will often be too high, especially for body protection.

In the context of the present application "monolayer" means a layer of substantially parallel reinforcing fibres embedded in a plastic matrix material. The term "matrix material" means a material which binds the fibres together and which wholly or partially encapsulates the fibres. Such monolayers (usually called prepregs by one skilled in the art) and methods of obtaining such a monolayer are disclosed in for instance EP-B-0.191.306 and WO 95/00318. A monolayer may be obtained by for instance pulling a number of fibres from a fibre bobbin frame over a comb so that they are oriented in coplanar and parallel fashion in one plane and then impregnating the fibres with the plastic. In this process, fibres may be used that have previously been coated with a polymer other than the plastic matrix material in order to, for instance, protect the fibres during handling or in order to obtain better adhesion of the fibres onto the plastic of the monolayer. Preferably, uncoated fibres are used. Impregnation of the reinforcing fibres with the plastic matrix material can be effected by applying one or more films of the plastic to the top, bottom or both sides of the plane of the fibres and then passing these, together with the fibres, through a heated pressure roll. Preferably, however, the fibres, after being oriented in coplanar, parallel fashion in one plane, are coated with an amount of a liquid substance containing the plastic matrix material of the monolayer. The advantage of this is that more rapid and better impregnation of the fibres is achieved. The liquid substance may be for example a solution, a dispersion or a melt of the plastic. If a solution or a dispersion of the plastic is used in the manufacture of the monolayer, the process also comprises evaporating the solvent or dispersant.

"Reinforcing fibre" here means an elongate body whose length dimension is greater than the transverse dimensions of width and thickness. The term "reinforcing fibre" includes a monofilament, a multifilament yarn, a tape, a strip, a thread, a staple fibre yarn and other elongate objects having a regular or irregular cross-section. Any natural or synthetic fibre may in principle be used as reinforcing fibre. Use may be made of for instance metal fibres, semi-metal fibres, inorganic fibres, organic fibres or mixtures thereof. For application of the fibres in ballistic-resistant moulded parts it is essential that the fibres be ballistically effective, which, more specifically, requires that they have a high tensile strength, a high tensile modulus and/or high energy absorption. It is preferred for the fibres to have a tensile strength of at least 1.2 GPa and a tensile modulus of at least 40 GPa.

Suitable inorganic fibres having a high tensile strength are for example glass fibres, carbon fibres and ceramic fibres. Suitable organic fibres having a high tensile strength are for example aramid fibres, liquid crystalline polymer fibres and fibres of for instance polyolefins, polyvinylalcohol, polyacrylonitrile which are highly oriented such as those obtained by means of a gel spinning process.

An extensive enumeration and description of fibres that may be used in the monolayer are given in WO 91/12136 (line 23 on page 6 to line 8 on page 12).

Homopolymers and copolymers of polyethylene and polypropylene are particularly suitable as polyolefins. Furthermore, the polyolefins used may contain small amounts of one or more other polymers, in particular other alkene-1-polymers.

It is preferred for the reinforcing fibres in the monolayer to be high-drawn fibres of high-molecular weight linear polyethylene. High molecular weight here means a molecular weight of at least 400,000 g/mol.

Linear polyethylene here means polyethylene having fewer than 1 side chain per 100 C atoms, preferably fewer than 1 side chain per 300 C atoms. The polyethylene may also contain up to 5 mol % of one or more other alkenes which are copolymerisable therewith, such as propylene, butene, pentene, 4-methylpentene, octene.

Preferably, use is made of polyethylene fibres consisting of polyethylene filaments prepared by a gel spinning process as described in for example GB-A-2042414 and GB-A-2051667. This process essentially comprises the preparation of a solution of a polyolefin of high intrinsic viscosity, spinning the solution to filaments at a temperature above the dissolving temperature, cooling down the filaments below the gelling temperature so that gelling occurs and drawing the filaments before, during or after removal of the solvent.

The shape of the cross-section of the filaments can be selected here through selection of the shape of the spinning aperture.

Preferably, the monolayer contains reinforcing fibres, preferably the aforementioned strong polyethylene fibres, with a denier per filament (dpf) greater than or equal to 1.5. Most preferably, use is made of multifilament yarns of ultrahigh molecular weight linear polyethylene with an intrinsic viscosity of at least 5 dl/g, determined in decalin at 135° C., and a yarn titre of at least 50 denier, with the yarn having a tensile strength of at least 35 cN/dtex and a tensile modulus of at least 1000 cN/dtex and the filaments having a cross-section aspect ratio of at most 3. The use of these fibres has been found to improve the high level of protection of the ballistic-resistant panel of the invention still further.

The plastic matrix material may wholly or partially consist of a polymer material, which optionally may contain fillers usually employed for polymers. The polymer may be a thermoset or thermoplastic or mixtures of both. Preferably a soft plastic is used, in particular it is preferred for the plastic matrix material to be an elastomer with a tensile modulus (at 25° C.) of at most 41 MPa. Preferably, the elongation to break of the plastic is greater than the elongation to break of the reinforcing fibres. The elongation to break of the matrix preferably is from 3 to 500%.

Thermosets and thermoplastics that are suitable for the monolayer are listed in for instance WO-A-91/12136 (line 26, page 15 to line 23, page 21). Preferably, vinylesters, unsaturated polyesters, epoxides or phenol resins are chosen as matrix material from the group of thermosetting polymers. These thermosets usually are in the monolayer in partially set condition (the so-called B stage) before the stack of monolayers is cured during compression of the ballistic-resistant moulded article. From the group of thermoplastic polymers polyurethanes, polyvinyls, polyacryls, polyolefins or thermoplastic, elastomeric block copolymers such as polyisoprene-polyethylene-butylene-polystyrene or polystyrene-polyisoprene-polystyrene block copolymers are preferably chosen as matrix material.

The plastic-matrix-material content of the monolayer is chosen sufficiently low, in any case lower than 30 wt. % relative to the total weight of the monolayer. Preferably, the content is lower than 20 wt. %, most preferably lower than 10 wt. %.

The fibre direction in each monolayer in the ballistic-resistant moulded article of the invention is rotated with respect to the fibre direction in an adjacent monolayer. This construction is hereafter referred to as being "cross-layered". Good results are achieved when this rotation amounts to at least 45 degrees. Preferably, this rotation amounts to approximately 90 degrees.

The relatively high density and an SEA value of at least 75 $Jm^2/kg$ of the compressed stack of the invention can be achieved by taking a number of measures. It is possible for instance to ensure in a number of stages in the manufacture of the moulded articles that as few low-density components, like air or from the polymer evaporated gasses as possible remain in the moulded article. This can for instance be accomplished by using a plastic of very low viscosity in impregnating the reinforcing fibres in the manufacture of the monolayer. It is also advantageous to spread the reinforcing fibres well during the impregnation process or to subject them to for instance ultrasonic vibration. As mentioned above, if multifilament yarns are used, it is important for a good spread that the yarns have a low twist. Furthermore, the plastic may be applied in vacuo. Each of these measures has a beneficial effect on the level of protection of a ballistic-resistant moulded article obtained with the monolayers but the level of protection of the moulded article of the invention is not attained or is attained only with great effort.

The invention also relates to a process for the manufacture of a ballistic-resistant moulded article in which monolayers are stacked cross-wise, whereupon the stack is compressed at a given pressure at an elevated temperature.

A process of this kind is disclosed in for instance WO 89/06190. It teaches that when the plastic matrix material is heated to its melting point, relatively low pressures are sufficient for shaping the moulded article. The pressures stated vary from 0.05 MPa to a maximum of 3 MPa.

It has now surprisingly been found that significantly higher SEA values than hitherto known in the state of the art can be attained by compressing and cooling the stack at a pressure of at least 5 MPa.

The pressure preferably is at least 7 MPa. In this way, the theoretical maximum density of the compressed stack is approached more closely and the level of protection against the impact of projectiles is increased further. The pressure preferably is at least 10 MPa, more preferably at least 13 MPa and most preferably at least 15 MPa. Preferably, the pressures during compression at an elevated temperature and during cooling are the same.

Compression at an elevated temperature is intended to mean that the moulded article is subjected to the given pressure for a particular compression time at a compression temperature above the softening or melting point of the plastic matrix material and below the softening or melting point of the fibres. The required compression time and compression temperature depend on the kind of fibre and matrix material and on the thickness of the moulded article and can be readily determined by one skilled in the art.

It has been found that in order for a high SEA value to be attained it is necessary that after compression at an elevated temperature cooling, too, take place under pressure. Cooling under pressure is intended to mean that the given minimum pressure is maintained during cooling at least until so low a temperature is reached that the structure of the moulded article can no longer relax under atmospheric pressure so that the SEA value cannot decrease. This temperature is easy to establish by one skilled in the art. It is preferred for cooling at the given minimum pressure to be down to a temperature at which the plastic matrix material has largely or completely hardened or crystallized and below the relaxation temperature of the reinforcing fibres. The pressure during the cooling does not need to be equal to the pressure at the high temperature, but it is preferred that these pressures are equal. The pressure loss resulting from shrinkage of the moulded article and the press due to cooling must regularly be compensated for so as to keep the pressure during cooling constant or at least on a sufficient high level.

As the stack of monolayers is heated to the desired compression temperature, the pressure preferably is increased to the desired level in, preferably at least three, discontinuous steps. In this way, blisters are prevented from forming.

For the manufacture of a ballistic-resistant moulded article in which the reinforcing fibres in the monolayer are high-drawn fibres of high-molecular-weight linear polyethylene, the compression temperature is preferably 115 to 130° C. and cooling to below 70° C. is effected at a constant pressure. Compression temperature here means the temperature at half the thickness of the moulded article.

In the process of the invention the stack may be made starting from loose monolayers. Loose monolayers are difficult to handle, however, in that they easily tear in the fibre direction. It is therefore preferred to make the stack from consolidated monolayer packages containing from 2 to 8, as a rule 2, 4 or 8, monolayers that are placed cross-wise. Consolidated is intended to mean that the monolayers are firmly attached to one another. Very good results are achieved if the monolayer packages, too, are compressed at an elevated temperature and cooled at a high pressure, preferably of at least 5 MPa.

U.S. Pat. No. 3,743,561 describes a process for the manufacturing of composite structures or articles from reinforcing fibers in a two step process. In the first step an intermediate structure is manufactured. In a second step a number of intermediate articles are assembled to form the composite article. Although U.S. Pat. No. 3,743,561 describes the objective of improving mechanical properties, no disclosure is given about ballistic properties of the structures or articles.

In another embodiment of the process of the invention the ballistic-resistant moulded article is manufactured by a process whereby, in a first step, a semi-manufactured article is produced by forming a stack of cross-layered monolayers, which stack has an areal density of from 0.25 to 5 $kg/m^2$ and subsequently compressing this stack at an elevated temperature and cooling this stack at a given first pressure whereupon, in a second step, the semi-manufactured articles are compressed onto each other at an elevated temperature and cooled at a given second pressure, with the first pressure being at least 5 MPa.

An advantage of this process is that, if the semi-manufactured articles are also compressed and cooled at a pressure of at least 5 MPa in the second step, the moulded articles obtained have a higher SEA value than moulded articles manufactured in a single compression step at the same pressure.

Another important advantage of the above-mentioned process is that high SEA values are attainable when the second pressure is relatively low, preferably at most 5 MPa. It has been found that good SEA values can be attained if the second pressure is lower than 5 MPa or even 3 MPa. A major advantage of this is that manufacturers of ballistic-resistant moulded articles, who often do not have high pressure moulds (i.e. higher than 5 MPa) at their disposal, can still achieve the good properties of the ballistic-resistant moulded article of the invention using conventional moulding equipment.

The semi-manufactured articles can then be centrally produced in locations where a high-pressure mould is available, for example at the manufacturer of the monolayers or monolayer packages.

The invention also relates to the semi-manufactured article for the manufacture of a ballistic-resistant moulded article of the invention that is obtainable by the first step in the above-mentioned process.

The semi-manufactured article has an areal density of from 0.25 to 5 $kg/m^2$. An areal density lower than 0.25 $kg/m^2$ has the disadvantage that the SEA value of the ballistic-resistant moulded article ultimately obtained is lower. An areal density higher than 5 $kg/m^2$ has the disadvantage that there is little flexibility in the choice of the areal density of the ballistic-resistant moulded article ultimately to be formed and that the cycle time for compressing the semi-manufactured article becomes unacceptably long. Preferably, the areal density of the semi-manufactured article is between 0.5 and 2.5 $kg/m^2$.

It has surprisingly been found that, using the process of the invention, higher SEA values are attainable if the reinforcing fibres in the monolayers have a cross-section aspect ratio of at most 3. Cross-section aspect ratio is intended to mean the ratio of the longest to the shortest principal axis of a perpendicular cross-section of the fibre. Preferably, the aspect ratio is lower than 2, more preferably lower than 1.5. It has been found that high SEA values are obtained at low compressive pressures in ballistic-resistant moulded articles in which the filaments have a lower aspect ratio (being rounder). For the same reason, the filaments preferably also have a fineness of 1.5 denier per filament or more.

Furthermore, it has been found that, using the process of the invention, higher SEA values are attainable at comparable compressive pressures if the monolayers employed in the ballistic-resistant moulded article are obtained by impregnating reinforcing fibres with an aqueous dispersion which contains the plastic matrix material.

Furthermore, it has been found that, using the process of the invention, higher SEA values are attainable at comparable compressive pressures if the monolayers employed in the ballistic-resistant moulded article have a fibre weight higher than 25, more preferably higher than 50 g/m². Preferably, the fibre weight is at most 150 g/m², more preferably lower than 100 g/m².

The invention is illustrated by means of the following examples without being limited thereto.

EXAMPLES I AND II AND COMPARATIVE EXPERIMENTS A AND B

Material used:

A monolayer package consisting of four monolayers disposed cross-wise at an angle of 90 degrees. The fibres are high-drawn fibres of high molecular weight linear polyethylene of make Dyneema SK66 (TM) with a strength of 32.5 cN/dtex, a modulus of 1015 cN/dtex and a fineness of 1 denier per filament with a cross-section aspect ratio of about 5. The monolayer contains 20 wt. % matrix material consisting of Kraton (TM) applied from an aqueous dispersion. Kraton is a styrene-isoprene-styrene triblock copolymer. The areal density of the monolayer package is 135 g/m².

Procedure:

A number of the above-mentioned monolayer packages were stacked to yield a package whereupon the package in its entirety was placed between two platens of a standard press. The temperature of the platens was about 125–130° C. The package was retained in the press until the temperature at the centre of the package was 115–125° C. Subsequently, the pressure was increased to a compressive pressure as stated in Table 1 below and the package was kept under this pressure for 15 min. Next, the package was cooled to a temperature of 60° C. at the same compressive pressure.

Test procedure:

The panels obtained were fired at in accordance with the procedure set out in STANAG 2920. Use was made of a 7.62×39 mm Mild Steel Core (PS Ball M 1943) bullet weighing 8 grammes. The bullet used had been obtained from Messrs Sellier & Bellot, Czech Republic. The experimental density of the panels was determined by accurate weighing and measurement of the volume using a Vernier calliper. The standard deviation according to this density measurement is 0.002–0.004 g/cm³.

Results:

The $v_{50}$ and SEA values as a function of the compressive pressure are given in Table 1. The stated SEA value was calculated from the total areal density of the ballistic-resistant moulded article. Relative density is intended to mean the ratio of the experimental density of the panel $\rho_P$ and the theoretical density of the panel, which is defined by $(\rho_f m_f + \rho_k m_k)$. The theoretical density of the ballistic-resistant moulded article as calculated from $\rho_f = 0.97$, $m_f = 0.8$ and $\rho_k = 0.943$ amounts to 0.965.

TABLE 1

| | AD (kg/m²) | compressive pressure (MPa) | $V_{50}$ (m/sec) | SEA (Jm²/kg) | Relative density |
|---|---|---|---|---|---|
| A | 33.5 | 1.0 | 591 | 42 | 0.969 |
| B | 33.5 | 2.5 | 668 | 53 | 0.974 |
| I | 33.8 | 7.0 | 825 | 81 | 0.990 |
| II | 26.9 | 16.5 | 772 | 89 | 0.992 |

The results indicate that, at equal areal density, the ballistic-resistant panel of the invention has a surprisingly higher SEA value than a panel with a lower rel. density. The table also shows that the panel of the invention can be obtained by choosing a compressive pressure of at least 5 MPa.

EXAMPLES III–VI

Material used:

A monolayer package consisting of four monolayers disposed cross-wise at an angle of 90 degrees. The monolayer package differs from the monolayer packages referred to in Examples I and II only in respect of the fibres used. The fibres are high-drawn fibres of high molecular weight linear polyethylene with a yarn titre of 880 denier, a tensile strength of 37.3 cN/dtex, a tensile modulus of 1220 cN/dtex, an elongation to break of 3.7%, a fineness of 2 denier per filament and a round cross-section aspect ratio of about 1. The monolayer contains 20 wt.% matrix material consisting of Kraton (TM). The areal density of the monolayer package is 135 g/m².

Procedure and testing:

Starting from the above-mentioned monolayer packages, ballistic-resistant moulded articles were produced at various compressive pressures and tested in the manner set out in Example 1. The ballistic-resistant panel obtained had an areal density equal to 25.9 kg/m² for all compressive pressures.

The results are given in Table 2.

TABLE 2

| Example | compressive pressure (MPa) | $V_{50}$ (m/sec) | SEA (Jm²/kg) | relative density (–) |
|---|---|---|---|---|
| III | 1.0 | 741 | 85 | 0.981 |
| IV | 2.5 | 768 | 91 | 0.988 |
| V | 7.0 | 913 | 129 | 0.996 |
| VI | 16.5 | 939 | 136 | 0.995 |

COMPARATIVE EXPERIMENT C AND EXAMPLES VII AND VIII

In Comparative Experiment C and Examples VII and VIII, ballistic-resistant moulded articles were produced from monolayer packages as described in Example I in the manner described above. The compressive pressures in Comparative Experiment C and Example VII were 1 MPa and 7 MPa, respectively. In Example VIII, semi-manufactured articles consisting of 5 monolayer packages were first moulded at a first compressive pressure of 5 MPa, which semi-manufactured articles were then stacked and compressed at a second pressure of 1 MPa. In each case, the compressive pressure was kept at the same level during cooling. The results are given in Table 3.

TABLE 3

| | AD (kg/m²) | compressive pressure (MPA) | $V_{50}$ (m/sec) | SEA (Jm²/kg) |
|---|---|---|---|---|
| C | 29.6 | 1 | 614 | 51 |
| VII | 33.8 | 7 | 825 | 81 |
| VIII | 29.1 | 5/1 | 739 | 75 |

COMPARATIVE EXPERIMENTS D AND E AND EXAMPLES IX AND X

As the first starting material (S1) a monolayer package available under the name of SpectraShield (TM) and consisting of four monolayers disposed crosswise at an angle of 90 degrees. The fibres are high-drawn fibres of high-molecular-weight linear polyethylene of make Spectra 1000 (TM) with a fineness of 5.5 denier per filament and a cross-section aspect ratio of about 1. The monolayer was obtained by impregnating the unidirectional fibres with a solution of the matrix material Kraton (TM).

As the second starting material (S2) a monolayer package was prepared by first preparing a monolayer starting from Spectra 1000 fibres which were impregnated with an aqueous dispersion (instead of a solution as in S1) of the matrix material Kraton. The yarn weight in the monolayer is 52 g/m$^2$, the matrix content is 20%. Of these monolayers four-layer monolayer packages were made.

The monolayer packages S1 and S2 were stacked and compressed into ballistic-resistant moulded articles as described above. In Comparative Experiment D and Example IX starting material S1 was used, in Comparative Experiment E and Example X starting material S2 was used. The compressive pressures used and the results are given in Table 4.

TABLE 4

| Example | AD (kg/m$^2$) | compressive pressure (MPA) | V$_{50}$ (m/sec) | SEA (Jm$^2$/kg) |
| --- | --- | --- | --- | --- |
| D (S1) | 24.9 | 1 | 524 | 44 |
| E (S2) | 22 | 1 | 598 | 65 |
| IX (S1) | 24.9 | 5 | 761 | 93 |
| X (S2) | 22 | 5 | 792 | 114 |

A comparison between Comparative Experiments D and E and Examples IX and X shows the great improvement in ballistic resistance. A comparison of the starting materials S1 and S2 in Examples VII and VIII shows the great improvement in ballistic resistance obtained when the monolayers have been prepared with an aqueous dispersion of the matrix material in combination with high-pressure compression.

What is claimed is:

1. A ballistic-resistant moulded article containing a compressed stack of monolayers, with each monolayer containing unidirectionally oriented reinforcing fibres and at most 30 wt. % of a plastic matrix material and with the fibre direction in each monolayer being rotated with respect to the fibre direction in an adjacent monolayer, wherein the density ($\rho_p$) of the compressed stack is at least 98.0% of the theoretical maximum density.

2. A ballistic-resistant moulded article according to claim 1, wherein the density $\rho_p$ is at least 99.0% of the theoretical maximum density.

3. A ballistic-resistant moulded article according to claim 1 or claim 2, wherein the reinforcing fibres in the monolayer have a tensile strength of at least 1.2 GPa and a tensile modulus of at least 40 GPa.

4. A ballistic-resistant moulded article according to any one of the claims 1–3, wherein the reinforcing fibres in the monolayer are high-drawn fibres of highmolecular-weight linear polyethylene.

5. A ballistic-resistant moulded article according to claim 1, wherein the plastic matrix material is an elastomer with a tensile modulus at 25° C. of at most 41 MPa.

6. A ballistic-resistant moulded article according to claim 1, wherein the rotation amounts to 90 degrees.

7. A ballistic-resistant moulded article according to any one of claims 1, 2, 5 or 6, wherein the moulded article has a specific energy absorption (SEA) of at least 75 Jm$^2$/kg on impact of a 7.62×39 Mild Steel Core P.S. Ball M1943 bullet.

8. A ballistic-resistant moulded article according to claim 4, wherein the moulded article has specific energy absorption (SEA) of at least 75 Jm$^2$/kg on impact of 7.62×⋦Mild Steel Core P.S. Ball M1943 bullet.

9. A process for manufacturing a ballistic resistant moulded article containing a compressed stack of monolayers, with each monolayer containing unidirectionally oriented reinforcing fibres and at most 30 wt. % of a plasctic matrix material in which a stack is made of crosswise-arranged monolayers, which stack is compressed under pressure of at least 5 MPa and at an elevated temperature and which stack is thereafter cooled under pressure, wherein the monolayers have a fiber weight between 25 and 100 gr/m$^2$ and the density ($\rho_p$) of the compressed stack is at least 98.0% of the theoretical maximum density.

10. A process for manufacturing a ballistic resistant moulded article in which in a first step a semi-manufactured article is produced by forming a stack of cross-layered monolayers, each monolayer containing unidirectionally oriented reinforcing fibers and at most 30 wt. % of a plastic matrix material, which stack has an areal weight of from 0.25 to 5 kg/m$^2$, and subsequently compressing this stack at an elevated temperature and cooling this stack at a given first compressive pressure wherein, in a second step, one or more of the semi-manufactured articles produced in the first step are compressed onto each other at an elevated temperature and cooled at a given second pressure, with the first pressure being at least 5 MPa to a compressed stack density ($\rho_p$) which is at least 98.0% of the theoretical maximum density.

11. A process according to claim 10, wherein the second pressure is at most 5 MPa.

12. A process according to claim 9 or 10, wherein the stack is made from consolidated monolayer packages containing from 2 to 8 monolayers that are placed cross-wise.

13. A process according to claim 12, wherein the monolayer packages, too, are compressed and cooled at a pressure of at least 5 MPa.

14. A process according to claim 12, wherein the pressure is at least 7 MPa.

15. A process according to claim 12, wherein the pressure is at least 10 MPa.

16. A process according to any one of the claims 9, 10 or 11, wherein the reinforcing fibres in the monolayers have a cross-section aspect ratio of at most 3.

17. A process according to any one of the claims 9, 10, or 11, wherein the monolayer has been obtained by impregnating the reinforcing fibres with an aqueous dispersion containing the plastic matrix material.

18. A process according to claim 17, wherein the monolayer has a fibre weight of between 50 and 150 g/m$^2$.

19. A ballistic-resistant moulded article obtainable according to the process of claim 8, wherein the moulded article has a SEA of at least 75 Jm$^2$/kg on impact of a 7.62 Mild Steel Core P.S. Ball M1943 bullet.

20. A process according to claim 15, wherein the reinforcing fibers in the monolayers have a cross-section aspect ratio of at most 3.

21. A process according to claim 20, wherein a monolayer has a fiber weight of between 50 and 150 g/m$^2$ .

* * * * *